United States Patent
Mayni et al.

(10) Patent No.: US 9,738,121 B2
(45) Date of Patent: Aug. 22, 2017

(54) TREAD BLOCK WITH FEATURES FOR IMPROVED THERMAL WEAR

(75) Inventors: Paul Andrew Mayni, Greenville, SC (US); Daniel McEachern Hicks, Greenville, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 1023 days.

(21) Appl. No.: 14/365,821

(22) PCT Filed: Dec. 20, 2010

(86) PCT No.: PCT/US2010/061236
§ 371 (c)(1),
(2), (4) Date: Jun. 16, 2014

(87) PCT Pub. No.: WO2012/087272
PCT Pub. Date: Jun. 28, 2012

(65) Prior Publication Data
US 2015/0090382 A1    Apr. 2, 2015

(51) Int. Cl.
B60C 11/11 (2006.01)
B60C 11/117 (2006.01)
B60C 11/03 (2006.01)
B60C 11/13 (2006.01)

(52) U.S. Cl.
CPC ........ *B60C 11/032* (2013.01); *B60C 11/0306* (2013.01); *B60C 11/0311* (2013.01); *B60C 11/0316* (2013.01); *B60C 11/1369* (2013.01); *B60C 2200/06* (2013.01)

(58) Field of Classification Search
CPC . B60C 11/0306; B60C 11/0311; B60C 11/032
See application file for complete search history.

(56) References Cited

U.S. PATENT DOCUMENTS

| 2,267,406 | A | 12/1941 | Krusemark |
| 4,329,090 | A | 5/1982 | Teague |
| 6,761,196 | B2 * | 7/2004 | Takubo ............... B60C 11/0309 152/209.12 |
| 8,875,755 | B2 | 11/2014 | Nakamura |
| 2005/0139303 | A1 | 6/2005 | Hirose |

(Continued)

FOREIGN PATENT DOCUMENTS

| GB | 2 005 200 | 4/1979 |
| GB | 2005200 A * | 4/1979 |

(Continued)

OTHER PUBLICATIONS

Machine translation for Japan 05-096913 (no date).*

(Continued)

*Primary Examiner* — Steven D Maki
(74) *Attorney, Agent, or Firm* — Dority & Manning, P.A.

(57) ABSTRACT

A tire tread having features that improve thermal wear performance is provided. A tread block is provided with an aperture. The aperture is positioned and sized in a manner that reduces stresses and/or strains in the tread block so as to reduce thermal wear. Certain variations in the depth and shape of the aperture are provided. Such tread feature can provide for a tire capable of operating at higher speeds for a given load.

13 Claims, 3 Drawing Sheets

(56) References Cited

U.S. PATENT DOCUMENTS

| | | | |
|---|---|---|---|
| 2008/0283167 A1* | 11/2008 | Matsumura | B60C 11/0083 152/209.11 |
| 2010/0200137 A1 | 8/2010 | Narita | |
| 2011/0024009 A1* | 2/2011 | Nakamura | B60C 11/032 152/209.1 |
| 2011/0308681 A1 | 12/2011 | Nakamura | |

FOREIGN PATENT DOCUMENTS

| | | | |
|---|---|---|---|
| JP | 63-067304 U | * | 5/1988 |
| JP | S63-67304 | | 5/1988 |
| JP | 05-032105 A | * | 2/1993 |
| JP | 05-096913 A | * | 4/1993 |
| JP | 05096913 | | 4/1993 |
| JP | 63162306 | | 5/1998 |
| JP | 20001055017 | | 2/2001 |
| JP | 2006273249 A | | 10/2006 |
| JP | 2010120534 | | 3/2010 |
| WO | WO-2009/104672 A1 | * | 8/2009 |
| WO | WO-2009/142639 A1 | * | 11/2009 |

OTHER PUBLICATIONS

Machine translation for Japan 05-032105 (no date).*
PCT International Search Report for PCT/US2010/061236, dated Feb. 17, 2011.
Extended European Search Report for PCT/US2010/061236, dated May 8, 2014.

* cited by examiner

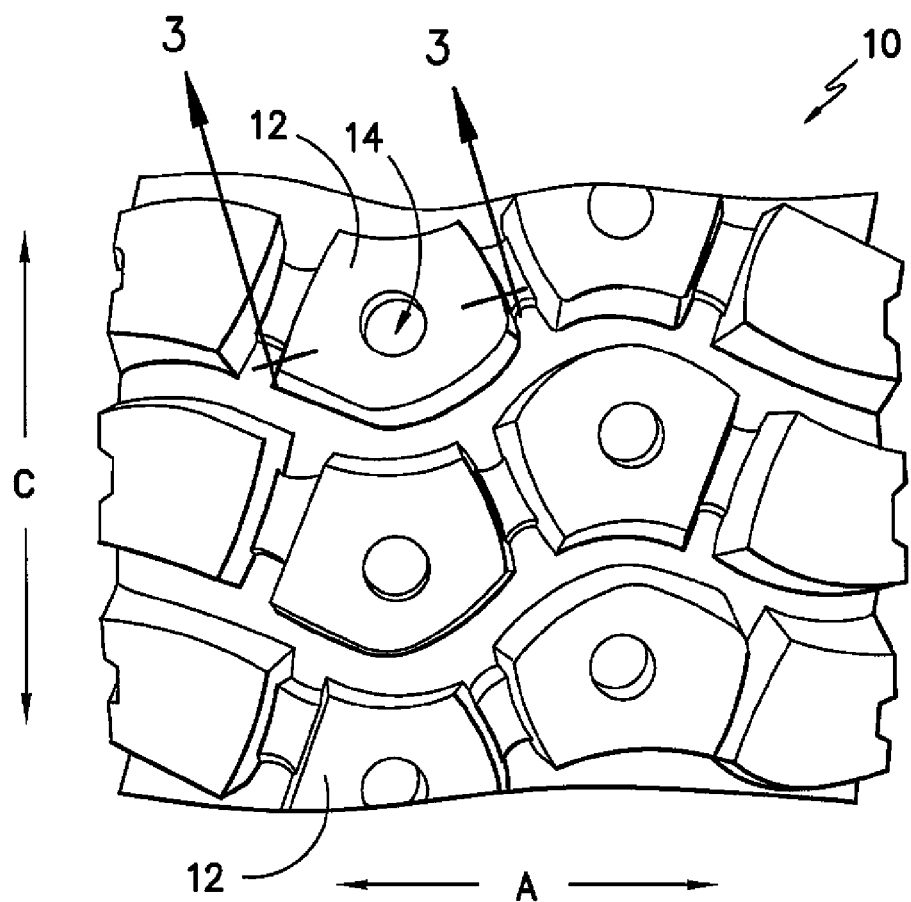
FIG. -1-
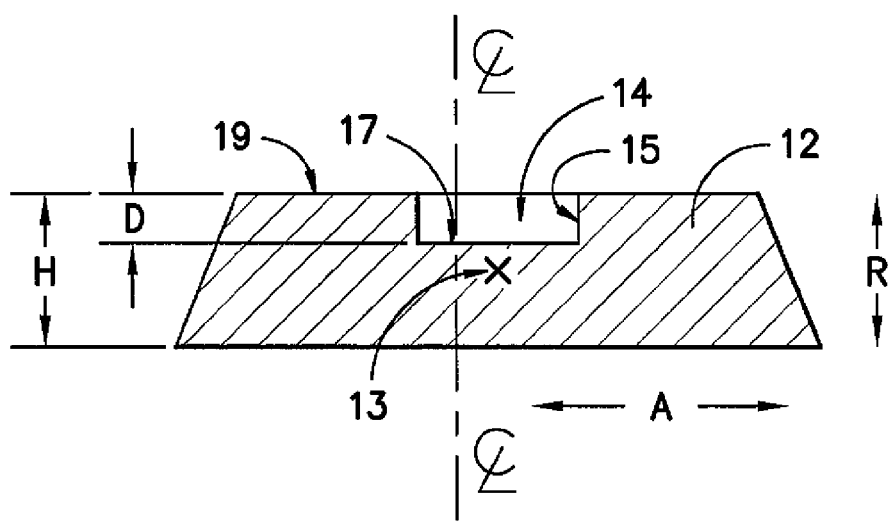
FIG. -2-

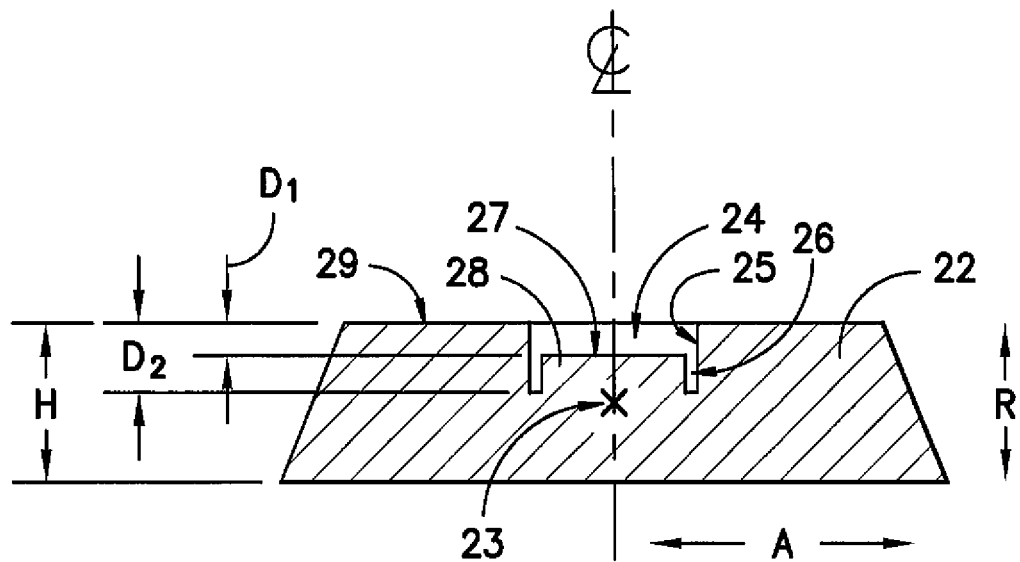
FIG. -3-
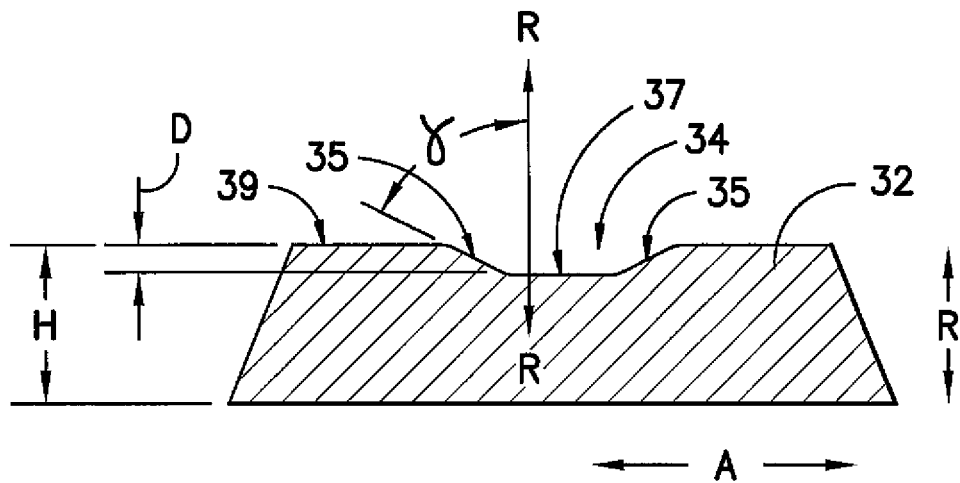
FIG. -4-

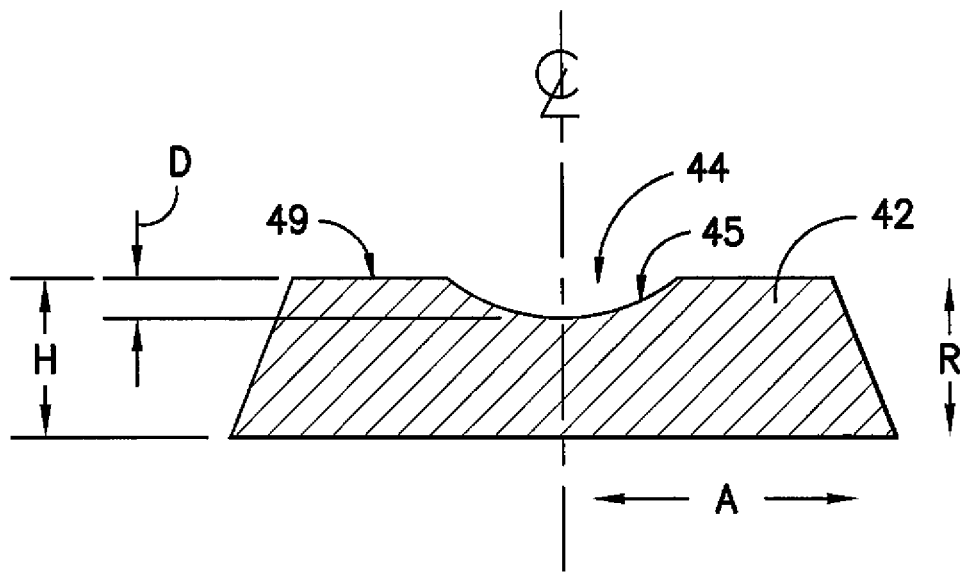
FIG. -5-
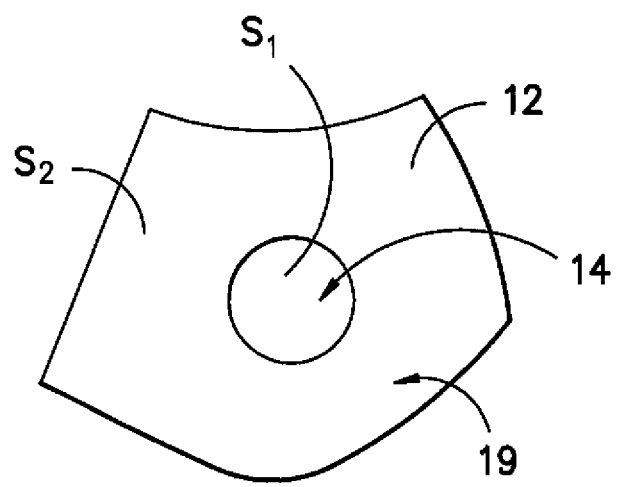
FIG. -6-

TREAD BLOCK WITH FEATURES FOR IMPROVED THERMAL WEAR

FIELD OF THE INVENTION

The present invention relates to a tire tread having features that improve thermal wear performance.

BACKGROUND OF THE INVENTION

Tire treads having large features such as large block sculptures with large grooves in between are frequently used on heavy vehicles that will travel off road such as e.g., military vehicles. The large blocks are associated by purchasers and users with toughness, durability, and/or improved traction in soft soils or mud. By way of example, tread blocks of size 90 mm by 80 mm and larger have been used in certain military applications.

As purchasers and users increase the weight placed on such tires by e.g., changes in vehicle design, the stress and strains experienced by such tires also increase, Such stress and strains generate heat in the materials of the tire that can be deleterious to the life of the tire, particularly the tread. More particularly, as the materials heat up they can also experience thermal wear in that the materials begin to degrade depending upon e.g., the magnitude of the stress and strain and the time period over which such is maintained by operation of the tire.

The thermal wear problem increases with increasing speed. As speed increases, the frequency of the tire's cycle of rotation through the contact patch increases. This increased frequency in turn leads to repeated stress and strain that increases the temperature and thermal wear.

One approach to reducing such thermal wear is to provide a speed limitation for the use of the tire based upon the loading of the tire. For example, a tire might have a limitation of 90 kph for load of 5600 kilograms on the tire. Different limitations might apply based upon the loading of the tire, the design of the tire, and other factors affecting thermal wear. However, for some applications, a speed limitation may not be practical. The applications for the vehicle may require operation at higher speeds. In addition, drivers may not be willing to limit their speed as required.

Other solutions that have been attempted include reducing the size of the tread blocks, using lower hysteresis materials, using a thinner architecture, and still others as well. These approaches, however, may not be available for some applications. For example, reducing the depth of the tread may be unacceptable to some purchasers because of the perceived impact of a shallower tread depth on e.g., off-road traction. Lower hysteresis materials may increase expense or come at a trade-off with other desired properties.

Accordingly, a tire having features that provide improvements in thermal wear would be useful. More specifically, a tire having tread features that provide for reducing strains and/or stresses within the tread so as to reduce thermal wear would be very beneficial. Such tread features that can be readily implemented in existing tire designs and tread constructions would also be useful.

SUMMARY OF THE INVENTION

Aspects and advantages of the invention will be set forth in part in the following description, or may be obvious from the description, or may be learned through practice of the invention.

In one exemplary embodiment, the present invention provides a tire that includes a tread portion for ground contact during operation of the tire. At least one tread block is located in the tread portion. The tread block defines a ground contacting surface, has a centroid, and a height H along the radial direction. An aperture is defined by the tread block and opens along the ground contacting surface of the tread block. The aperture is in radial alignment with the centroid of the tread block. The non-zero depth D of the aperture within the tread block along the radial direction is less than 0.25 of the height H of the tread block.

Various shapes can be used for the aperture. For example, the aperture can be circular in shape, can include a shape that is similar to the shape of the tread block, and can include other shapes as well. By way of further example, the aperture can be circular in shape and define a center-line that intersects the centroid of the tread block. Alternatively, the aperture can be circular in shape and define a center-line that is offset relative to the centroid of the tread block.

The aperture has a projected surface area of $S_1$. The tread block has a un-apertured ground contacting surface area of $S_2$. The ratio of $S_1$ to $S_2$ can be in the range of about 5 percent to about 25 percent. In certain embodiments, $S_1$ is in the range of about 252 mm$^2$ to about 1300 mm$^2$.

The tire can further include a tread block having a projection positioned within the aperture. The projection defines a groove located within the aperture that surrounds the projection. The projection defines a top surface, which can be at a non-zero depth along the dial direction of 4 mm or less.

In still another alternative, the tire can include a tread block having walls that define the aperture. The walls can be oblique with respect to the radial direction. For example, the walls can be provided at a non-zero angle of less than 80 degrees with respect to the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of a portion of a tire tread according to an exemplary embodiment of the present invention.

FIG. 2 provides a cross-sectional view of an exemplary embodiment of a tread block of the present invention, taken along line 3-3 as shown in FIG. 1.

FIGS. 3-5 each provide cross-sectional views of still other exemplary embodiments of tread blocks of the present invention.

FIG. 6 is a perspective view of the ground contacting surface of the tread block of FIG. 1 and provides an identification of surface areas S1 and S2 of the exemplary embodiment of FIG. 1 as more fully described below.

DETAILED DESCRIPTION OF THE INVENTION

The present invention provides a tire tread having features that improve thermal wear performance. More specifically, a tread block is provided that defines an aperture. The aperture is positioned and sized in a manner that reduces stresses and/or strains in the tread block so as to reduce thermal wear. Certain variations in the depth and shape of the aperture are provided as described below, This tread feature can provide for a tire capable of operating at higher speeds for a given load.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Referring now to FIG. 1, a perspective view of a portion of a tire tread 10 according to an exemplary embodiment of the present invention is provided. Tread portion 10 includes multiple tread blocks 12 positioned along circumferential directions C and axial directions A. Tread portion 10 extends along the axial direction between the sidewalls and/or shoulders (not shown) of the tire.

Tread blocks 12 are shown in FIG. 1 as part of a particular shape and a particular pattern. However, the present invention is not limited to a particular shape for tread block 12 or a particular pattern for tread portion 10. Other shapes for block 12 arranged in different tread patterns may also be used. Additionally, blocks 12 are relatively large compared to the overall width of tread portion 10 along the axial direction A. While the present invention may provide more impact with such larger block treads, the scope of the present invention includes blocks of various sizes as will be understood from the claims that follow.

As shown in FIGS. 1 and 2, tread block 12 defines an aperture 14 with wall 15 and bottom surface 17. Aperture 14 includes a centerline C/L that intersects a centroid 13 of tread block 12. As used herein, the centroid of a tread block refers to the center of mass of tread block 12. For a tread block constructed from a relatively homogeneous material such as a uniform rubber composition, the location of the centroid can be determined geometrically without regard to density variations.

Aperture 14 also has a depth D as shown in FIG. 2, which is the amount by which aperture 14 is recessed below the ground contacting surface 19. As also shown, aperture 14 does not include centroid 13 of tread block 12. More specifically, centroid 13 is located outside of aperture 14. The depth D of aperture 14 relative to centroid 13 may be varied provided, however, that depth D is maintained at non-zero value of less than 0.25 of height H. Accordingly, for the exemplary embodiment shown where height H is e.g., about 25 mm, depth D is a preferably a non-zero value less than 5 mm. Even more preferably, depth D is in the range of about 1 mm to less than 5 mm for a tread block having e.g., a height of about 25 mm. A variety of widths along the axial direction A may be used. For example, a width in the range of 5 mm to 30 mm may be used as well as other dimensions.

Referring now to FIG. 6, $S_1$ is the projected surface area of aperture 14. Stated alternatively, $S_1$ is the surface area of ground contacting surface 19 that is removed by aperture 14. $S_2$ is the un-aperatured surface area of the ground contacting surface of tread block 12. More specifically, $S_2$ is the amount of ground contacting surface area that tread block 12 would have if aperture 14 were not present. Accordingly, $S_2$ includes the surface area of ground contacting surface 19 as well as $S_1$, the projected surface area of aperture 14.

The relative amounts of surface area for $S_1$ and $S_2$ may be varied provided, however, that the ratio of surface area $S_1$ relative to surface area $S_2$ is in the range of about 5 percent to about 25 percent. For example, for a tread block 12 located towards the center of the tread as in FIG. 1 and having a surface area $S_2$ of 5200 mm$^2$, an aperture 14 with a projected surface area $S_1$ in the range of about 260 mm$^2$ to about 1300 mm$^2$ can be used. For a tread block located near the shoulder or outside of tread portion 10 having a surface area $S_2$ of 5037 mm$^2$, a projected surface area $S_1$ in the range of about 252 mm$^2$ to about 1259 mm$^2$ can be used.

Although shown with the centerline C/L of aperture 14 intersecting centroid 13, it should be understood that other configurations may be used as well, provided that the location of aperture 14 remains in radial alignment with centroid 13 of tread block 12. As used herein, "radial alignment" means that some part of aperture 14 intersects a radius (i.e. a line parallel to radial direction R) that passes through centroid 13. For FIG. 2, the centerline of aperture 14 is coincident with such a radius. However, other constructions may be used such that centerline C/L is offset relative to a radius that passes through centroid 13.

FIG. 3 provides another exemplary embodiment of a tread block 22 having an aperture 24 as may be used with the present invention. Aperture 24 is defined by walls 25 provided by tread block 22. Within aperture 24, a projection 28 extends along radial direction R. Projection 28 and walls 25 of aperture 24 define a groove 26 that surrounds projection 28. As shown in FIG. 3, $D_2$ denotes the depth of aperture 24 including groove 26. For this exemplary embodiment, depth $D_2$ is a preferably a non-zero value of less than 0.25 of height H. For example, if height H of tread block 22 is about 25 mm, then preferably depth $D_2$ is a non-zero value of less than 5 mm. As with the previous embodiment, the projected surface area $S_1$ relative to surface area $S_2$ is in the range of about 5 percent to about 25 percent.

Projection 28 defines a top surface 27 that is positioned within aperture 24. $D_1$ denotes the distance along radial direction R by which top surface 27 is recessed below ground contacting portion 29. Preferably $D_1$ is a non-zero value in the range of less than 5 mm. Even more preferably, $D_1$ is a non-zero value in the range of about 4 mm or less. As with the embodiments of FIGS. 1 and 2, the centerline C/L of aperture 24 can intersect centroid 23 of tread block 22 or can be offset thereto provided that aperture 24 remains in radial alignment with such centroid 23.

While FIGS. 1 through 3 depict an aperture that is circular, other shapes and configurations may be used well provided the depth and projected surface area restrictions for the aperture are followed as describe above. For example, non-circular shapes may be applied. In one exemplary embodiment of the invention, the aperture includes a shape that is substantially similar to the shape of the tread block. More particularly, the walls of such an aperture follow the shape of the tread block but are offset to provide a ground contacting portion.

Different shapes for the wall(s) of the aperture may also be applied provided the depth and projected surface area projections previously described are maintained. For example, another exemplary embodiment of a tread block 32 of the present invention is shown in FIG. 4. Tread block 32 includes an aperture 34 defined by walls 35. As shown, walls 35 are at an angle γ with respect to radial direction R. In this way, walls 35 provide a smoother transition between top surface 39 and the bottom surface 37 of aperture 34, which may be preferable for certain applications. By way of example, angle γ may be in the range of 0 to 80 degrees.

FIG. 5 illustrates another exemplary embodiment of a tread block 42 of the present invention. Tread block 42 includes an aperture 44 having a smooth surface 45 created as an arc of a radius whose center is coincident with centerline C/L. Aperture 44 has a depth D in the ranges previously described. Arcs of different shapes may be used as well. As with previous embodiments, centerline C/L of aperture 44 may intersect the centroid of block 42 or may be offset provided aperture 44 remains in radial alignment with the centroid. A blend may also be provided between the intersection of the arc and the top surface 49 of the tread 42. The depth and surface area restrictions previously described apply to the apertures in the exemplary embodiments of FIGS. 4 and 5 as well.

Table I presents certain experiments that were conducted using a tread pattern similar to that of FIG. 1, where tread blocks of about 21 mm in height H and 90 mm×80 mm in size were provided with apertures of 25 mm in diameter at depths of 1 mm, 5 mm, and 15 mm. Table I shows the gain in the speed limit for the tire that was obtained using these apertures. In a manner that was unexpected, a 1 mm deep aperture and a 5 mm deep aperture provided a substantially similar result in the speed limit increase for the tire, while a depth of 15 mm provided a less effective result.

TABLE I

| Aperture Depth | Aperture Diameter | Speed Limit Gain |
| --- | --- | --- |
| 15 mm | 25 mm | 5.5 kph |
| 5 mm | 25 mm | 8.3 kph |
| 1 mm | 25 mm | 7 kph | kph = kilometers per hour

Without being limited to a particular theory of operation, it is believed that the apertures decrease the amount of material that is stretched and compressed during operation and thereby help decrease heat generation. This in turn allows for a speed limit gain. The effectiveness of the aperture of the invention may be more pronounced as the size of the tread block increases. However, in a manner that is unexpected, the effect may also have a boundary or may not have a linear relationship to aperture depth as shown from the results in Table I.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire for heavy vehicles, comprising:
   a tread portion for ground contact during operation of the tire;
   at least one tread block located in said tread portion, said tread block defining a ground contacting surface and having a centroid, said tread block having a height H along the radial direction;
   an aperture defined by said tread block and opening along the ground contacting surface of said tread block, said aperture in radial alignment with the centroid of said tread block, wherein the non-zero depth D of said aperture within said tread block along the radial direction is less than 0.25 of the height H of said tread block;
   wherein said aperture has a projected surface area of $S_1$ and said tread block has an un-apertured ground contacting surface area of $S_2$, wherein that ratio of $S_1$ to $S_2$ is in the range of about 5 percent to about 25 percent, and wherein $S_1$ is in the range of about 252 mm$^2$ to about 1300 mm$^2$.

2. The tire as in claim 1, wherein said aperture is circular in shape and defines a centerline that intersects the centroid of said tread block.

3. The tire as in claim 1, wherein said aperture is circular in shape and defines a centerline that is offset relative to the centroid of said tread block.

4. The tire as in claim 1, wherein the shape of said aperture is substantially similar to the shape of said tread block.

5. The tire as in claim 1, wherein the depth of said aperture within said tread block along the radial direction is in the range of about 1 mm to about 5 mm.

6. The tire as in claim 1, further comprising a projection positioned within said aperture and defining a groove located within said aperture and surrounding said projection.

7. The tire as in claim 6, wherein said projection defines a top surface, the top surface being at a non-zero depth along the radial direction of 4 mm or less.

8. The tire as in claim 6, wherein said aperture is circular in shape and defines a centerline that intersects the centroid of said tread block.

9. The tire as in claim 6, wherein said aperture is circular in shape and defines a centerline that is offset relative to the centroid of said tread block.

10. The tire as in claim 6, wherein the shape of said aperture is substantially similar to the shape of said tread block.

11. The tire as in claim 1, wherein said tread block includes walls that define said aperture, and wherein said walls are oblique with respect to the radial direction.

12. The tire as in claim 1, wherein said tread block includes walls that define said aperture, and wherein said walls are a non-zero angle of less than 80 degrees with respect to the radial direction.

13. The tire as in claim 1, wherein said tread block includes walls that define said aperture, and wherein said walls are provided with a curvature.

* * * * *